United States Patent
O'Rear et al.

(10) Patent No.: US 10,982,178 B2
(45) Date of Patent: Apr. 20, 2021

(54) SYSTEM FOR WORT GENERATION

(71) Applicant: Hydro-Thermal Corporation, Waukesha, WI (US)

(72) Inventors: Sean O'Rear, Wauwatosa, WI (US); James C. Zaiser, Elm Grove, WI (US)

(73) Assignee: Hydro-Thermal Corporation, Waukesha, WI (US)

(*) Notice: Subject to any disclaimer, the term of this patent is extended or adjusted under 35 U.S.C. 154(b) by 534 days.

(21) Appl. No.: 15/723,492

(22) Filed: Oct. 3, 2017

(65) Prior Publication Data

US 2018/0094229 A1    Apr. 5, 2018

Related U.S. Application Data

(60) Provisional application No. 62/403,407, filed on Oct. 3, 2016.

(51) Int. Cl.
| | | |
|---|---|---|
| *C12C 7/06* | (2006.01) | |
| *C12C 7/22* | (2006.01) | |
| *C12C 13/02* | (2006.01) | |
| *C12C 7/20* | (2006.01) | |
| *C12C 7/00* | (2006.01) | |
| *B01D 1/16* | (2006.01) | |
| *C12C 3/00* | (2006.01) | |
| *C12C 7/28* | (2006.01) | |
| *B01B 1/02* | (2006.01) | |

(52) U.S. Cl.
CPC ............... *C12C 7/06* (2013.01); *B01D 1/16* (2013.01); *C12C 7/00* (2013.01); *C12C 7/20* (2013.01);
(Continued)

(58) Field of Classification Search
CPC ........... C12C 7/06; C12C 13/025; C12C 7/22; C12C 7/28; C12C 7/00; C12C 7/20; C12C 9/02
(Continued)

(56) References Cited

U.S. PATENT DOCUMENTS

| | | | | |
|---|---|---|---|---|
| 3,945,310 A | * | 3/1976 | Stenne | ................... A01J 25/111 |
| | | | | 99/452 |
| 7,111,975 B2 | | 9/2006 | Fenton et al. | |

(Continued)

FOREIGN PATENT DOCUMENTS

| | | |
|---|---|---|
| DE | 19828688 A1 | 7/1999 |
| DE | 19835434 A1 | 2/2000 |

(Continued)

OTHER PUBLICATIONS

International Search Report and Written Opinion for PCT/US2017/054866 dated Jan. 3, 2018.

*Primary Examiner* — Phuong T Nguyen
(74) *Attorney, Agent, or Firm* — Andrus Intellectual Property Law, LLP

(57) ABSTRACT

A system and method for generating wort utilizing steam injection heating and stratified flow. The system mixes a fine ground grain with water to form a slurry. The slurry is pumped through a steam injection heater to form a mash. The heated mash enters into a stratified vessel that creates a stratified temperature profile from a first end to a second end. The stratified heating vessel allows the mash to flow from the first end to the second end without internal mixing. After retention within the mash coil, the wort is directed to a mash filtration unit. After filtration, the wort enters into a boil kettle and is heated using a second steam injection heater. The boil kettle includes a spray head that directs brewing liquor onto the wort to reduce foam within the boil kettle. Finally, the wort passes through a scraped surface sieve that removes particles from the heated wort.

15 Claims, 8 Drawing Sheets

(52) U.S. Cl.
CPC ............... *C12C 7/22* (2013.01); *C12C 13/025* (2013.01); *B01B 1/02* (2013.01); *C12C 7/28* (2013.01); *C12C 9/02* (2013.01)

(58) Field of Classification Search
USPC ......... 99/276, 278, 283, 288, 298, 317, 352, 99/443, 452, 460
See application file for complete search history.

(56) References Cited

U.S. PATENT DOCUMENTS

| | | |
|---|---|---|
| 8,193,395 B2 | 6/2012 | Fenton et al. |
| 8,513,004 B2 | 8/2013 | Heathcote et al. |
| 2006/0083819 A1 | 4/2006 | Olsen et al. |
| 2010/0233769 A1* | 9/2010 | Heathcote ............... C12P 19/14 |
| | | 435/157 |
| 2010/0303984 A1 | 12/2010 | Wasmuht et al. |
| 2014/0287129 A1* | 9/2014 | Hutcheson ............... C12C 7/053 |
| | | 426/618 |

FOREIGN PATENT DOCUMENTS

| | | | |
|---|---|---|---|
| DE | 102004046716 A1 | 4/2006 | |
| GB | 1321009 | * 5/1971 | ............... C12C 7/04 |
| GB | 1321009 A | 6/1973 | |
| WO | 2004050820 A1 | 6/2004 | |
| WO | 2007136252 A1 | 11/2007 | |

* cited by examiner

SYSTEM FOR WORT GENERATION

BACKGROUND AND SUMMARY

The brewing industry currently utilizes few innovations in the production of wort for beer or distillation. The techniques and equipment used to generate these products are centuries old and advances in food production have not been applied successfully to the brewing industry. The process and system outlined in this disclosure provides a solution to the inefficiencies found in the process and equipment ubiquitous in today's breweries.

Current technologies rely on tanks, also called tuns, to mash, separate, boil, and clarify wort for fermentation. Tanks slow production speeds due to inefficient heating, leading to long heating times, long enzymatic conversion times, and poor temperature control. Tanks also have no ability to repeatably control mash conditions optimal for enzymatic conversion, leading to batch to batch inconsistencies. In order to speed production using traditional brewing equipment, more tanks are required in order to separate the processes into specialized vessels. This consumes a large footprint in the brewery and reduces the ability to add fermentors, which reduces annual beer production.

The present disclosure aims to resolve these problems by utilizing a stratified flow paradigm using a process heater, the preferred method being steam injection heating, in combination with a number of ancillary processing techniques. Incorporated into this disclosure is the design of a mash coil system which can integrate ultra fast mash heating and a stratified flow paradigm such that enzymatic conversion conditions can be repeatably attained. Additionally, due to the fast heating abilities, total extraction times are greatly reduced. This coiling system has the unique ability to pair with either traditionally roller milled grains or hammer milled grains for additional extract yields. It can also additionally be paired with recirculation systems for non-enzymatic conversion of other carbohydrate products.

Traditional methods of beer mashing utilize vessels (mash tuns) to heat or hold heated beer mashes to provide the environment for enzymatic conversion of starches into fermentable sugars. However, inherent to mash tuns is the inability to accurately create or hold temperatures of the entire mash throughout the mashing phase. Heating the mash in a tun creates hot and cold zones which yield batch-to-batch inconsistencies, requires high horsepower agitated mixers which consume large amounts of energy, slows the extraction times due to slow heat stepping in multiple infusion mashes, and promotes dough balls which reduce batch efficiencies.

Reductions in the capital investment, production delays, space requirements, as well as speed and temperature accuracy of wort creation create the need for a new mashing process. The present disclosure allows very fast and accurate heating of the mash in order to create the most optimal environment for conversion of starches into fermentable sugars, presents a small relative footprint for a given process size, requires low energy consumption per volume of mash produced, and reduces common processing problems like dough balls, caramelization, and polyphenol extraction.

Boil kettles are traditionally slow to produce boiling temperatures after the influx of separated wort from the lauter tun or mash filter, typically only 75° C. to 78° C. This lag time slows the brewing cycle and creates batch-to-batch inconsistencies. Additionally, the traditional kettle is prone to boil-overs, which reduces efficiencies in wort yield, and creates batch-to-batch inconsistencies. Kettles also vent to the atmosphere, which reduces energy recovery effectiveness. However, this equipment is necessary to the brewing process in order to vent off-compounds found in grain, and isomerize alpha acids from hops.

The value of the traditional brewing kettle is understood and respected in this invention, however enhancements to this equipment can be realized in the addition of a wort defoaming apparatus to prevent boil overs, and controlled heating above atmospheric boiling temperatures through steam injection. Heating wort in excess of 100° C. reduces boiling times by flashing off-compounds known to detract from beer flavor faster, and reduces hop usage by increasing hop utilization. This design can additionally be combined with existing energy recovery methods to achieve low energy consumption.

The traditional way of heating water is to have a hot liquor (water) tank that holds at least twice the brewing volume of water, such as shown by boil kettle 2 in the prior art system drawing of FIG. 1. This tank is usually heated with an internal steam coil, direct fire, or has liquor pumped through an internal or external heat exchanger, such as shown by reference numeral 3 in FIG. 1. The heat exchanger 3 receives a supply of steam 4. The water stays heated in this tank 10 for long periods of time, thus the tank is insulated to maintain the heat as much as possible. The liquor is usually kept at 80° C.-85° C. The reason is that it is easier to blend cool water with a hot liquor stream in order to get to a specific temperature than it is to heat to a specific temperature in a traditional brewery. Therefore breweries simply accept the energy wastes involved in this process. It is very difficult to achieve an exact strike temperature using this method, and it is common to be 3-7° C. away from the desired strike temperature. Cold water blending is not exact, can change rapidly, and is difficult to automate due to the difference between winter water temperatures and summer water temperatures associated with the mixing water. Because of this, it is common to introduce variability in the brewing process and unexpected delays due to the time it takes to get a mash to the correct temperature.

The present disclosure solves these problems and other problems associated with the traditional mashing processes by utilizing the cold water dispersion attributes of starch to its advantage. Starch disperses evenly and quickly in cold water with no dough balls. Due to the abilities of steam injectors to instantly heat the entire mash to mash-in temperatures, this allows the present disclosure to heat the brewery liquor at the same time as the grains, and does not require holding heated brewing liquor in a hot liquor tank. This eliminates the cost and footprint of a vessel, lag times from traditional heating methods, and dough balls which reduce mashing efficiencies.

Method and Apparatus to Heat Beer Mash in a Stratified Flow Paradigm

Current methods of heating beer mash utilize heated water to mix with grains and/or jacketed tanks with heating sources including steam, hot water or direct flames. When using hot water, it is difficult to control the mashing temperatures in the tank, often leading to significant temperature variation in the mash. Additionally, heating using a jacket leads to product damage and increases heat-up time. Both methods, often used in conjunction with each other, provide poor temperature control in the mash itself. Cross-sectional temperature variations can be 5° C.-10° C. in some systems.

The importance of mash temperature control is paramount to consistency in the brewing cycle, as mash is not cooked. The ideal piece of mashing equipment simply creates an environment for the mash to become most biologically active. This is where enzymes, either added to or naturally available in the grains, convert starches into fermentable sugars. Temperature is one of the most important parameters of effective enzymatic conversion and is the hardest to control.

The present disclosure includes a new apparatus and process to both heat mash to a very specific temperature and maintain even temperature throughout the mashing cycle.

The first major difference in the system and method of the present disclosure is the creation of a stratified vessel, with the preferred device according to the present disclosure being a mash coil. In prior systems, such as shown in FIG. 1, a hot liquor tank 11 is used to mix the supply of starch 5 and water 6. Once mixed, the supply is transferred to a lauter tun 12 to allow for internal mixing of mash from the tank walls to the interior and from the top/bottom to the center of the vessel. Mixing and heating of the mash creates uneven temperature profiles.

To solve this problem, the present disclosure utilizes a vessel with specific dimensions that can be crafted to minimize mixing and maintain stratified flow. The preferred configuration of the present disclosure utilizes a coil of even toral dimension across every rotation in order to maintain an even internal pipe velocity gradient. This type of coil generates laminar flow at the highest possible flowrates to allow for fast processing with minimal mixing. This is important so that the extraction time and temperature can be produced, maintained and repeated with the least amount of variation for optimum batch-to-batch consistency.

Another key benefit inherent in the design of the present disclosure is the fact that temperature steps during the mashing phase now have no lag time. As a new heating cycle starts, the hot mash pushes in stratified flow against colder mash from the previous temperature phase. Thus the "plug" of mash is already at the next temperature while the previous "plug" is still in the vessel. Through this method, a significant reduction in mashing time can be achieved simply by eliminating the lag time due to traditional heating methods.

The present disclosure is also capable of temperature rises in a single pass through the heating coil far in excess of a traditional mash heating paradigm. The taught maximum temperature rise in tradition systems, such as shown in FIG. 1, is 1° C./min (Weinstephan), which dictates the maximum speed for heating in a tank without significant damage to the beer mash. A single steam injection heater used in accordance with the present disclosure has the ability to heat mash 80° C. in a single pass without damage to the mash. This allows the mash coil to heat hydrated mash to mash-in temperatures in a single pass.

One of the technical advantages of integrating steam injection as the heating source, is that it can heat mash to very precise temperatures in a single pass. The ability to hold temperature accuracy to less than 1° C. from set point is currently not possible with traditional systems. The possibility arises now to completely remove the hot liquor tank because it can heat the brewing liquor (water) and the grains at the same time. This has the additional benefit of preventing the formation of dough balls.

The second use of the traditional hot liquor tank is to hold sparge water. Sparging in the traditional brewery is the act of introducing hot brewing liquor to the grains in order to heat the mash to approximately 78° C. to deactivate enzymatic activity, and also to rinse the residual sugar from the grains. In the present disclosure, timing and sequencing of water in the stratified vessel allows the mash heating source to also act as an on-demand sparge water heater.

The traditional process of mashing is to mill whole grain coarsely through a roller mill. This will crack the individual kernels, which exposes the inner starchy endosperm while still leaving the particles large. The goal is to make less than 8-10% flour in this process. The brewer will then take a temperature and weight measurement of the milled grain (now called grist). This grist is fed into the mash tun through a hydrator where strike water (heated brewing liquor) is sprayed onto the grist in order to form a slurry. The temperature of the strike water is such that the mass and temperature of the colder grain, combined with the mass and temperature of the hot liquor, equals a specific mash temperature in the tun, called the strike temperature.

As stated above, it is very difficult to achieve an exact temperature using this method, and it is common to be 3-7° C. away from the target strike temperature.

Ending below the strike temperature will not necessarily damage the wort, but it takes additional time to increase the temperature of the mash to the proper strike temperature, which can delay the brewing process. Additionally, heating quickly through tank jackets can damage the portion of the mash that is in contact with the tank walls.

Ending over the strike temperature causes bigger problems as there may be loss of enzymatic activity and the possibility to extract tannins from the grain husks, which significantly reduces the quality of the finished beer. Additionally, the only way to cool down the mash is mix in cold water, which is not only a slow and inaccurate process, but waters down the mash. If the brewer is using 100% water in the mash tun in their process, then the final wort will not meet quality specifications.

Additionally, the tank heating model shown in the prior art of FIG. 1 has been proven to have hot and cold zones within the vessel at all points in the mashing process. These temperatures can be as great as 50° C. when heating to a temperature step. Moreover, mash tuns are not be able to accurately control the exact temperature of the mash at all points, which means that the temperature gradient can never be repeated. This adds batch-to-batch inconsistency to the brewing process.

Additionally, hot strike water is traditionally mixed with the cold grains at a targeted blended temperature which is over the gelatinization temperature for starch. This creates dough balls (also known as fisheyes) that cause processing problems, as no enzymatic conversion of starches happens in unwetted grains. The grain in the center of the dough balls does not start the enzyme process until the ball is broken down. This can negatively affect the sugar yield of the final mash and most certainly slows down the process.

This method of the prior art is also dependent on lautering. After the mashing phase is over, the mash is transferred to a lauter tun 12. The lauter tun 12 has a screen 13 on the bottom of the tank. The mash is added to the tank of the lauter tun 12, and the wort (the liquid portion) flows through the slits in the screen and exists via line 14 where it is processed as waste. The wort is withdraw at the bottom of the tank and transferred via line 15 to the boil kettle 2. The physical separation of the grain from the top of the screen 13 is one reason the particle size has to be large. This is a gravity method of separating the grain solids from the wort. This process is very slow, allows the wort to lose heat, and can "stick". A stuck mash is where the grain bed becomes so compacted that liquid will no longer flow through the grain for separation. This reduces the quantity of wort reclaimed, and increases the time it takes to achieve a boil in the kettle. Perhaps most impactful is the fact that since the particle size of the grain must be large—the amount of extractable sugar from the grain is reduced—significantly.

This yields a good model for a retrofitable version of the technology that allows brewers to increase the technical level of brewing at a lower expense and with fewer additional impacts to their process. However, it still utilizes a tun which will:

Temperature gradients reduce repeatability
Increases cleaning times and chemical usage
Still relies on lautering for solids removal
Still produces 75%-85% mash efficiencies
Take large amount of floor space The preferred configuration for grain filtration with the present disclosure utilizes a mash filtration system. Mash filters allow whole grains to be milled in a hammer mill to a fine flour and then dispersed into the brewing liquor. Additionally by pairing with cold water hydration and heating in a single pass, as with the present disclosure, a combination of benefits can be achieved. Ultra-high mash extraction percentages, low water consumption, low thermal energy consumption, and very short wort generation cycles are all possible.

Method and Apparatus to Boil Beer Wort Using Controlled Steam Injection

Current methods of boiling beer wort utilize jacketed kettles or calandrias (internal or external), such as shown by the boil kettle 2 in FIG. 1, to heat the wort from the lauter tun 12 or mash filter (typically around 75° C.), to boiling. These methods all heat through a metal surface, or plate, such that the surface temperature of the metal plate is anywhere from 130° C. to 170° C. One of the main flaws of this method of boiling is that the lowest velocity area of the wort is at the heated surface. This creates residence time of the wort at the point of greatest heat, and in turn generates burn-on and caramelization of the wort.

The major cause of burn-on is the Maillard reaction, which binds proteins in the wort to sugars and this compound deposits on the piping or tanks walls. These deposits reduce the heating efficiency of the apparatus by insulating the heating surface, and create a cleaning problem with the residual surface film. Caramelization of wort sugars is another side effect of effective heating, which affects wort quality by darkening the color and artificially creating flavors in the burnt spectrum (toffee, caramel, and raisin).

Other limitations of current methods are seen in the inability to heat the wort over boiling temperatures. Kettles must be specially outfitted as pressure vessels to achieve these higher temperatures above boiling. Calandrias must also be pressurized to achieve this over temperature, but can be erratic due to foaming. Additionally, kettles must be sized and rated for the steam consumption needs to deliver these temperatures, which drive their size and cost up, but their efficiencies down.

Additionally, the current methods have a long lag time. Lag time is the time it takes to heat the incoming wort from the filtration exit temperature to boiling. Very commonly, lag times of 15 to 30 minutes are needed to reach the desired temperature, which creates added time in the brewing process. For example, when making five worts in a day with a 30 minute lag time, there are 2.5 hours in the brew day where the brewer is simply waiting for the wort to boil in the kettle. These times can also vary depending on ambient temperature, barometric pressure, steam pressure, equipment temperature, etc. This yields a variable amount batch to batch, for boiling time, which impacts the consistency of the generated wort.

The present disclosure consists of a method of wort boiling in a vessel equipped with a steam injection heating device designed to immediately boil incoming wort from filtration. This method is superior to existing methods in many ways. First, it has the ability to nearly instantly boil wort from an incoming temperature as low as 30° C. This eliminates the lag time most brewers face in the normal production of beer wort. Additionally, it brings the ability to easily heat over boiling to achieve a terminal temperature up to 140° C. This allows for much higher hop utilization in the boil, which comes with a significant reduction in hop usage.

Heating over 100° C. also flashes off excess water when the pressurized hot wort re-enters the atmospheric tank. This improves VOC removal from grain derived off-compounds naturally found in the wort, allowing for shorter boil times than with traditional methods.

An additional configuration, could integrate the boiling vessel and the mash stratified vessel, into a single tank system, which significantly reduces the brewing footprint and increases heating efficiencies by retaining heat into the given processes.

An additional configuration of this boiling vessel includes a high-flow recirculation loop that allows for thermal conversion of starch in non-enzymatic carbohydrate reactions.

Method and Process For Dispersing Wort Foam in Boil Kettle to Prevent Boiling Over When boiling, wort foam is a processing problem because it forms at a faster rate than it breaks down. The effect of foam is known as a boil-over, whereby the foam will overflow out of the manway of the kettle, or into the exhaust pathways. These effects create exhaust air flow reductions, cleaning problems, and loose wort during the boil over, which is a high value product. Additionally, when hops are first introduced into the boiling wort, the hops tend to float, so boil-overs during this phase reduce hop concentrations that can affect the qualities of the finished beer.

Current methods of controlling boil overs due to foam consist of pumping boiling wort against the underside of a china cap. This results in a downward spray that helps mechanically break-down the foam. This method is not always effective at controlling boil-overs as foam hardiness changes as the boil progresses. Additionally, if the brewer fills the boils kettle to a volume over the china cap, this method is ineffective as a means of controlling foam.

Typically, to solve this problem, brewers manually spray cold water from a cold water hose onto the foam. The spray action with cold water is an effective means to control the foam, but adds a variable and undetermined amount of water to the recipe. This variability causes batch-to-batch inconsistency and changes the mineral concentration of the beer, which can affect the qualities of the finished beer. Additionally, this method cools down the wort, which can take time to regain a vigorous boil. This problem is exacerbated when used in conjunction with boiling methods where temperatures over 100° C. are achieved. This method creates an excess amount of foam, requiring additional foam suppression methods.

The present disclosure consists of a method of wort preparation in conjunction with a boil kettle equipped with high pressure, low flow spray heads. Wort preparation consists of creating a high gravity wort (22° P to 30° P) and preparing the wort with the mineral salt additions for the entire volume of target worts (11° P to 15° P). Water can be added to the kettle for foam control so long as the added water does not reduce the sugar concentration lower than the target wort. To ensure this does not happen, the use of high pressure, low flow nozzles are integrated into the kettle such that the motive force of the water droplets act to mechanically disrupt the foam, which is aided by the thermal shock of cold water acting to shrink the bubble size. This solution is integrated into the top of the kettle, so the specific volume of wort in the kettle does not reduce its effectiveness, as it does with current designs.

The source of water for the boil-over protection device is a system-wide high pressure, sterile cold water system. The water in this system is filtered, un-tempered brewing liquor or reverse osmosis water. The pH is adjusted using acid in-line, possibly though a dosing pump with controls. The concentration of acid could be sensed using a conductivity or pH transmitter to send a signal to the brewing software, which controls the dosing pump such that the water is at the target pH.

Through this method, high pressure water gives highly effective foam control without affecting the hop balance or hop extraction times in the kettle In addition, the amount of filtered water added to reduce foam is monitored in the control system so that the sugar to water ratio of the final wort and other qualities of the finished beer are preserved.

Method and Apparatus For Energy Recovery in Steam Injection System

Steam injection is revolutionary in its ability to effectively heat to very controlled temperatures using less total energy than any other current heating process. This is inherently due to steam condensate being consumed into the heated process. Though it is energy efficient on the product heating side, it creates a boiler energy recovery problem on the utility side.

By using steam injection and not returning heated condensate back to the feed water, the boiler must use some of its heating capacity, in the form of steam, to preheat the incoming boiler feed water. This is known as a 100 percent make-up boiler system. It is necessary to heat this water to a minimum of 60° C., but more commonly to temperatures above 80° C., in order to prevent thermal shock and damage to the boiler system. The more steam that is required to preheat the feed water, the less efficient the entire energy balance of the boiler system becomes.

In order to recover thermal energy back to the boiler, the use of a thermal battery is integrated into the present disclosure. The thermal battery is "charged" and "discharged" similarly to an electrical battery. Charging circuits are flows that supply hot liquid to the thermal battery. Through integrated heat exchangers, the liquid in the battery accepts the heat and stores it in thermal battery elements, while simultaneously cooling the circuit. This cooled circuit then leaves the battery to be charged with additional heat energy. The charging circuits in this system are the wort cooling device located after the boil kettle 2 and the vapor condenser equipped on the boil kettle 2. Additionally, this battery can receive thermal charges from any number of other heated energy recovery systems, such as refrigeration reclamation heaters, in order to increase energy recovery efficiencies.

The battery discharges all of the stored thermal energy back to the boiler system in order to preheat incoming feed water. This enables efficient energy reclamation to heat the feed water above 80° C. without the use of steam, and thereby creating a highly efficient heating system.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
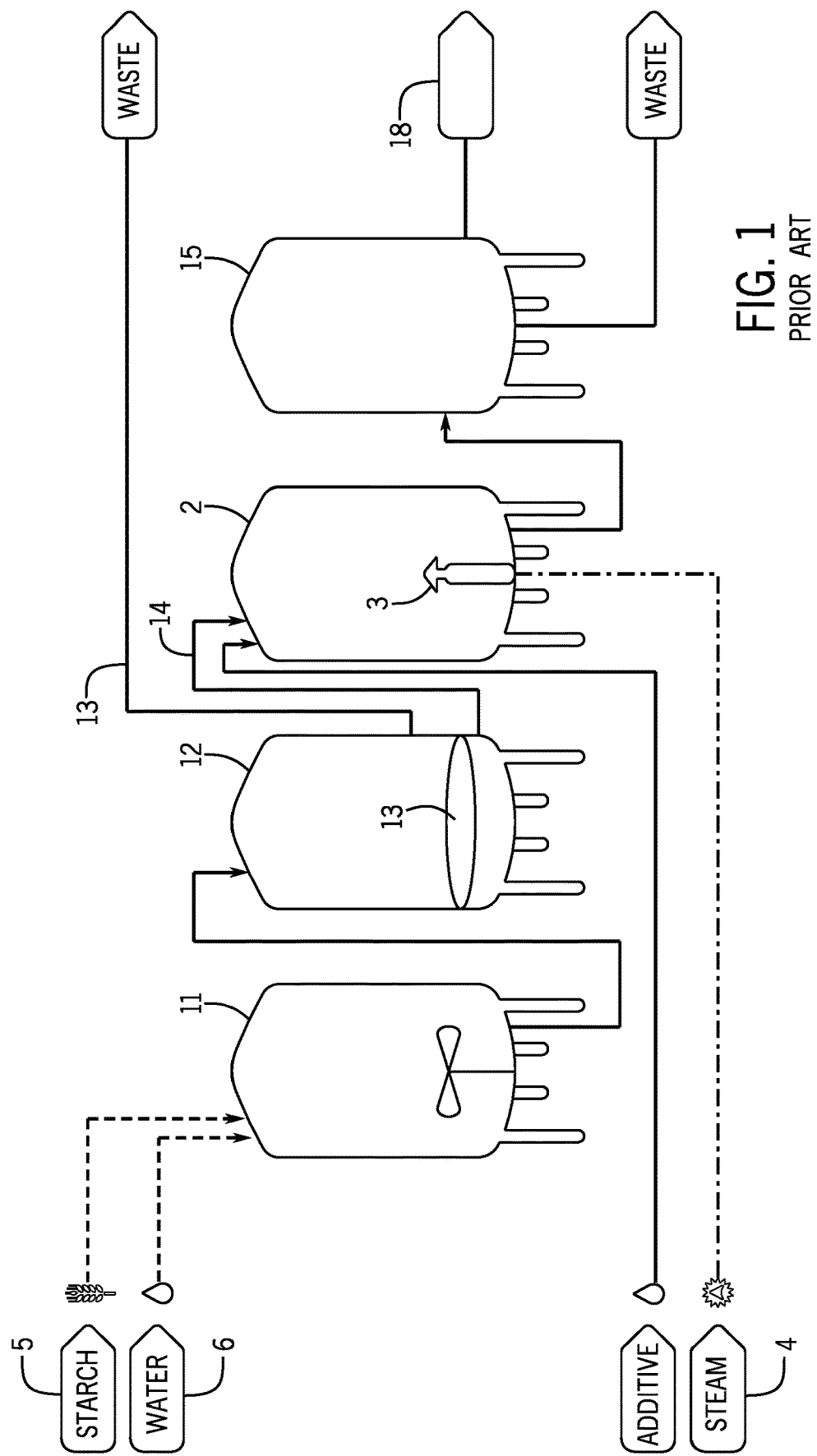
FIG. 1 is an illustration of a prior art brewing process.

FIG. 1 illustrates a prior art system that generally illustrates a conventional method utilized to brew beer. The subject matter of FIG. 1 is incorporated into the present application to facilitate the understanding of the typical brewing process such that the typical brewing process can be compared to the method and system of the present disclosure. The traditional brewing method includes a hot liquor tank 11 that is used to retain a volume of hot brewing liquor (filtered and processed water) to be used in the brewing process. The hot liquor tank 11 is heated with an internal steam coil and is used to bring the volume of the tank up to a desired temperature typically around 80° C.-85° C.

The heated liquor from the hot liquor tank 11 is mixed with a supply of cold water to reach a strike temperature. The cooled liquor is then drawn into a mash lauter tun 12. Although separate hot liquor tank and lauter tun 12 is shown in FIG. 1, these two vessels could be combined. The cooled liquor from the tank 11 is added to the mash included in the lauter tun 12. In the lauter tun 12, the grain and water are mixed and heated to create a mash. During this process, the mash temperature may be raised as desired in the brewing process. The drawbacks and problems associated with such mashing and mash temperature control have been set forth above.

In the mash lauter tun 12, the combination of water and grist form a sugary liquid called "wort", which is then drained from the bottom of the tank in a process known as lautering. This utilizes a screen 13 on the bottom of the lauter tun, whereby the used grist, now called "spent grains", is held on top of the screen 13 while the liquid wort flows through the screen 13. The drawbacks and problems associated with such lautering are set forth above. The wort is then pumped to the boil kettle 2 where it is boiled and other ingredients, such as hops, herbs or sugars can be added to the wort. In the boil kettle 2, many of the chemical and technical reactions take place within the wort that affect the flavor, color and aroma of the beer being made. The drawbacks and problems associated with such heating are set forth above.

In the embodiment shown in FIG. 1, the boil kettle 2 feeds product to a whirlpool 15 in which the hops and other solids are separated out, and the clear wort is withdrawn and communicated to a heat exchanger 18 while the final waste product is withdrawn and discarded or used for other purposes. Following the heat exchanger 18, the cooled wort goes to a fermentation tank (not shown). The embodiment shown in FIG. 1 is meant to provide one common example of the brewing process so that the common example can be compared to the method and system to be described in detail below.

Figure 2:
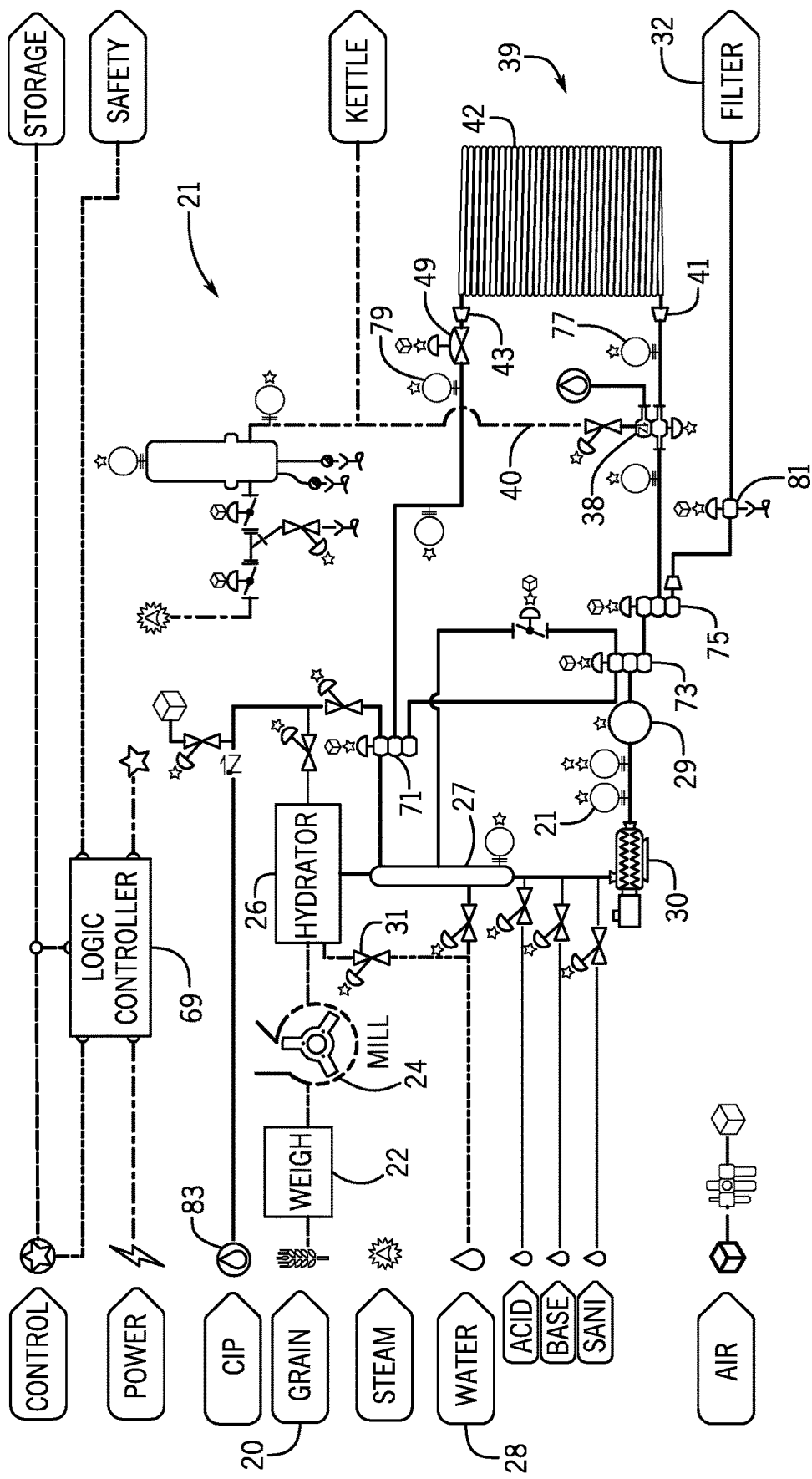
FIG. 2 is a schematic illustration of the operational components of the system of the present disclosure.
Figure 3:
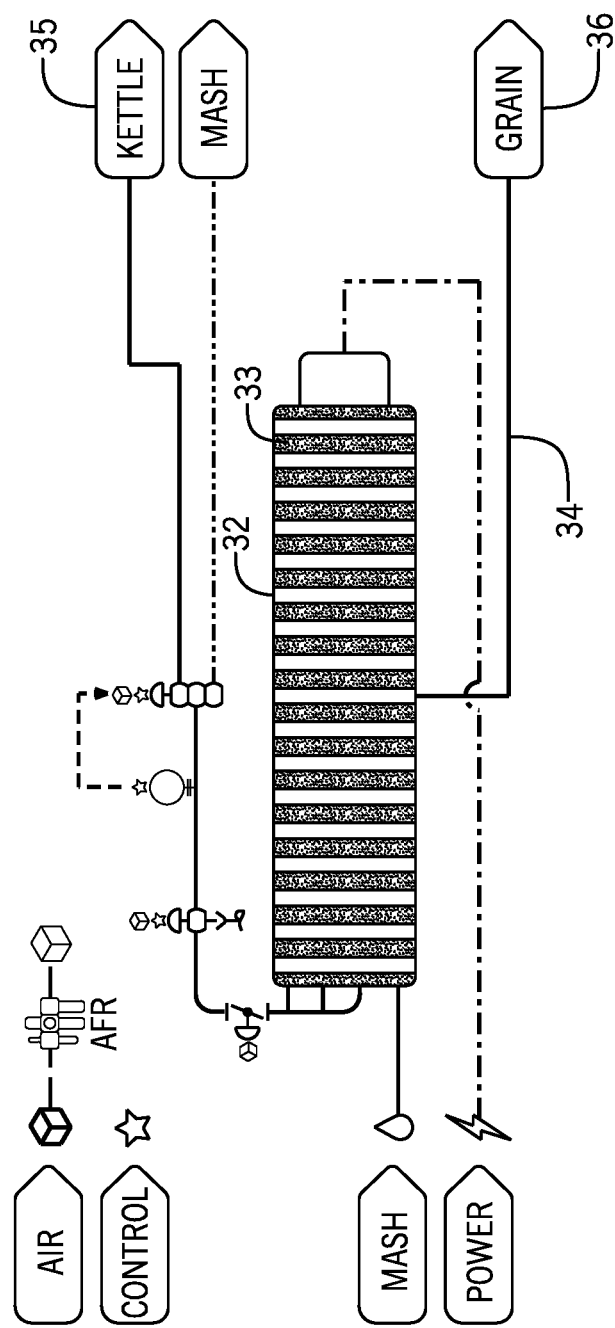
FIG. 3 illustrates a mash filtration unit to be utilized with the system of FIG. 2.
Figure 4:
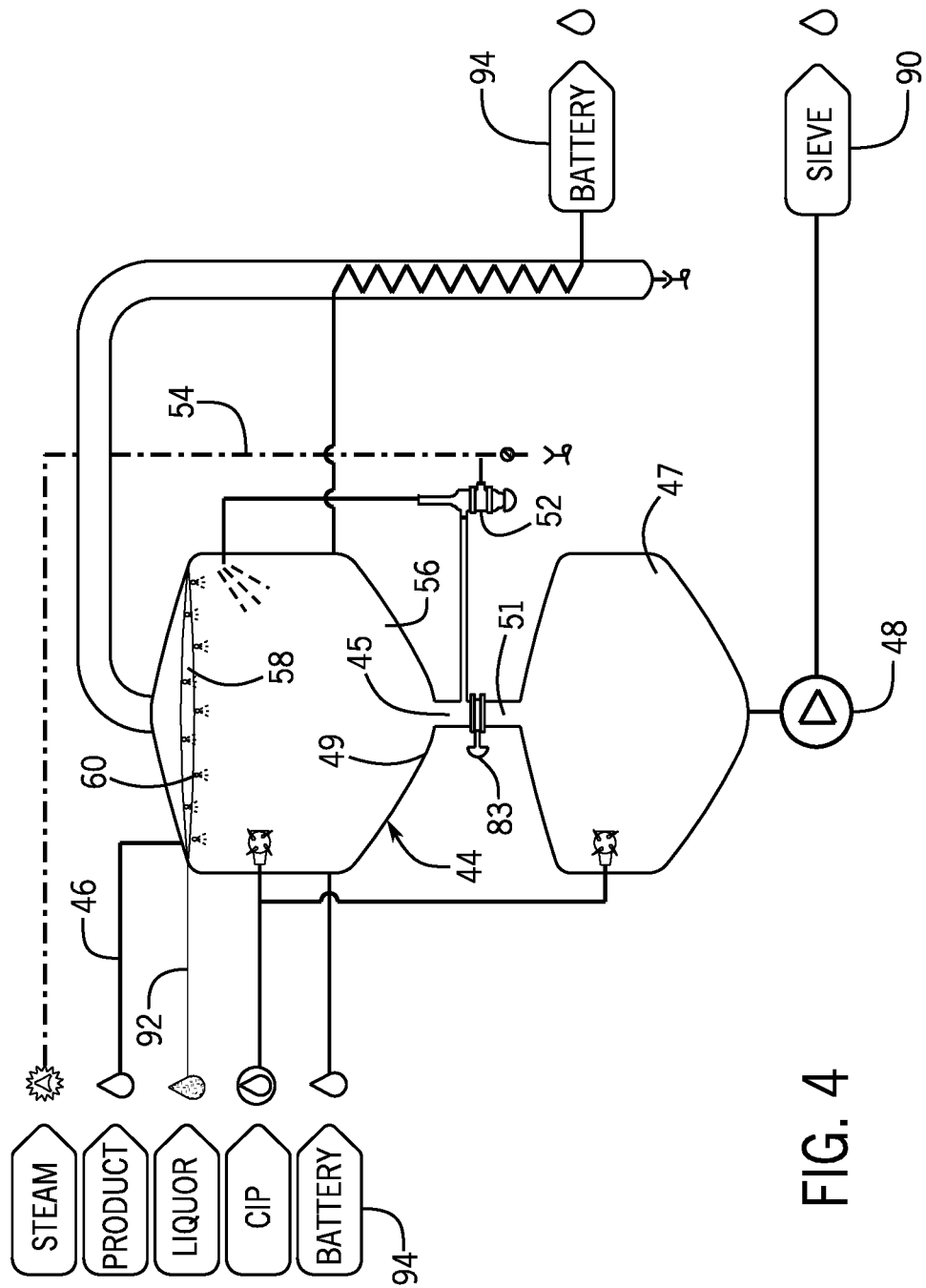
FIG. 4 is an illustration of a boil kettle and spray nozzle utilized in accordance with the present disclosure.

FIGS. 2-4 illustrate system 21 and method of generating wort for use in a brewing process in accordance with the present disclosure.

As illustrated in FIG. 2, grain 20 is initially received and weighed in step 22. After the weighing step 22, the grain enters into a hammer mill 24 where the grain is ground into a fine, flour-like consistency. The use of a hammer mill 24 is different from the prior art brewing process described above. In the prior art process, the grains are milled to a much larger particle size, which was required for the lautering step after mashing. The present disclosure utilizes a much different mash filtration system as will be described below such that a much finer particle size can be used in the mashing step.

From the hammer mill 24, the grain is received within a hydrator 26 that is used to add water to the ground grains (grist) to form a slurry. The supply of water 28 to the hydrator 26 is controlled by a flow valve 31. In accordance with the present disclosure, the hydrator 26 mixes cold water with the grist to eliminate the formation of "dough balls".

The complete mixing between the water and the grist takes place within an expansion chamber 27, which includes multiple inputs which will be described in detail below. After mixing in the expansion chamber 27, the slurry of water and grist can be drawn from the expansion chamber 27 by a mash pump 30. In the embodiment shown in FIG. 2, the mash pump 30 is a twin screw pump, although other types of pumps are contemplated as being with the scope of the present disclosure. The operation of the mash pump 30, and all of the other components of the system 21 are controlled by a controller 69. The controller 69 is able to monitor and control all of the aspect of the wort generation process as will be described in greater detail below.

The use of the finely ground grist created by the hammer mill 24 has proven to mix quickly and completely with the water added through the hydrator as compared to mixing the ground grain in the prior art system shown in FIG. 1. The use of the much more finely ground particle of grain eliminates the creation of "dough balls", which is one of the advantages of the subject matter of the present disclosure.

The slurry leaving the expansion chamber 27 is referred to as a "mash" and feeds the inlet of the mash pump 30 and is ready for further processing and heating. In accordance with the present disclosure, the embodiment shown in FIG. 2 includes a steam injection heater 38 that receives the mash from the output of the mash pump 30. At least one temperature sensor 21 and flow sensor 29 are positioned downstream from the mash pump 30 such that the controller can monitor the flow rate of the mash and the temperature of the mash at this point in the process. In one embodiment of the present disclosure, the steam injection heater is a commercially available product, such as the Infuze cooker available from Hydro-Thermal Corporation. However, other types or models of the steam injection heater are contemplated as being within the scope of the present disclosure.

The steam injection heater 38 receives a supply of steam along line 40 and is able to inject the steam into the supply of mash to heat the mash quickly with very tight temperature control to a desired set point. The operation of the steam injection heater 38 is again controlled by the controller 69. The heated mash leaving the steam injection heater 38 is then received at a lower, first end 41 of a stratified heating vessel 39. The stratified vessel 39 is a device that creates a stratified temperature profile of the mash as the mash moves from the first end 41 to a second end 43. In the embodiment shown in FIG. 2, the stratified vessel 39 is a mash coil 42 formed as a stacked coil of pipe that extends from the first end 41 to the second end 43, although other embodiments of the stratified vessel 39 are contemplated.

The mash coil 42 has a constant outer and inner diameter across every rotation in order to maintain an even internal pipe velocity gradient. In addition, the internal diameter of the pipe that forms the mash coil is also constant over the entire length of the coil. This design allows for both laminar flow and turbulent flow depending upon needs at the highest possible flow rates to allow for fast processing without internal bulk mixing. The mash coil 42 is designed such that exact extraction time and temperature profiles can be produced, maintained and repeated for optimal batch-to-batch consistency.

The back pressure valve at the inlet of the expansion chamber 27 closes as the mash pump 30 speeds up to the mashing flowrate in order to maintain the mashing cycle pressure. The steam injector injection heater opens to begin heating the mash to the target strike temperature. This initial heating cycle continues until the entire mash is at the strike temperature. This is sensed by instruments in the mash coil 42 such that the control system reduces the amount of steam injected into the coil while maintaining both pressure and flow.

This heating process repeats for each step in the temperature of the mash according to the brewers recipe, until the last temperature preceding mash-out. The mash pump 30 stops and transfer valves change over to direct flow from the mash pump 30 to the top of the mash coil 42.

As shown in FIG. 2, a flow control valve 49 can be opened to allow the heated mash to leave the mash coil 42. Brewing liquor is introduced to a specific percentage of the mash volume in the expansion chamber 27, and the mash pump 30 pushes this sparge water to the top of the mash coil 42. The mash is then pushed in the opposite direction through the steam injection heater 38 and toward the mash filtration unit 32. While the mash is passing, the steam injection heater 38 heats the mash to the mash-out temperature. This continues until the sparge water volume to the inlet of the mash pump 30 has exhausted. The mash pump 30 stops, and transfer valves change isolate the mash pump 30. Pressurized $CO_2$ then pushes against the sparge water plug to evacuate the mash coil 42 of the mash, which is still heating to the mash-out temperature. Instruments in the mash coil 42 detect the interface between the cold sparge water plug and the heated mash plug, such that when the interface come in contact with the steam injection heater 38, it opens to heat the sparge water plug from ambient to the mash-out temperature in a single pass. When the sparge plug has evacuated the mash coil 42, the steam injection heater 38 closes off steam and the mash coil 42 has been rinsed with the sparge water, is empty, and is ready for the next mash cycle.

As the mash leaves, the temperature can be measured by a temperature sensor 79. Several three way valves 71, 73 and 75 control the direction of the flow the mash after the mash leaves the mash coil 42. The mash can be directed back into the expansion chamber 27 or to valve 73 by the first valve 71. Valve 73 can return the mash to the expansion chamber 27 or direct the mash to the valve 75. Valve 75 can be controlled to either direct the mash back to the steam injection heater 38 for another heating step or the mash can be directed to the next processing step, which includes the filter 32. It is contemplated that more than one pass though the steam injection heater 38 will be used to heat the wort to the designated temperature before the heated wort is allowed to dwell within the mash coil 42. While the mash is dwelling in the mash coil 42, the different positions of the mash do not mix with each other, which enhances the temperature control and temperature profile in the mash coil 42. Controller 69 is used to control the various three way valves and the steam injection heater 38.

The importance of mash temperature control is paramount to consistency in the brewing cycle, as mash is not cooked. The mash coil 42 creates an environment for the mash to become most biologically active. The steam injection heater 38 and mash coil 42 combine to both heat mash to a very specific temperature and maintain even temperature throughout the mashing cycle.

The mash coil 42 with specific dimensions is crafted to prevent bulk mixing, which is important so that the exact extraction time and temperature can be produced, maintained and repeated for optimum batch-to-batch consistency. The mash will create a plug of material in the coil of the mash coil 42 where the portion of the solid mash near the second end 43 will not mix with the portion of the solid mash near the first end 41. In this manner, the head and tail of the solid mash can be monitored by temperature sensors 77 and 79 to further aid in temperature control.

The source of heating is the steam injection heater 38 which can deliver extremely high temperature rises in a single pass and with very accurate and precise temperature control. Additionally, when integrated into a mashing apparatus including the mashing coil, the steam injection heater can create stratified flow of temperature gradients such that exact extraction timing is possible.

Other key benefits inherent in this design are the fact that step mashing cycles can now be made more parallel across time. As a new heating cycle starts heating mash, that hot mash pushes in stratified flow against colder mash from the previous cycle. Thus the "plug" of mash is already at the next temperature step while the previous "plug" is still in at the previous temperature step. Through this method, a significant reduction in mashing time can be achieved.

In the embodiment shown in FIG. 2, after processing and possibly multiple heating cycles and a required dwell time in the mash coil 42, the hydrated, heated mash is directed through a flow control valve 81 to a mash filtration unit 32. However it is contemplated that there are several possible configurations for flow of mash and sparge water, which utilize the heater in multiple flow directions for optimal processing efficiency.

In the embodiment shown in FIG. 2, the system includes a clean-in-place system that can direct water 28 or another liquid through the system as desired. Water supply 28 can also be used to push the plug of mash from the mash coil 42 though the correct position of the valves 71, 73, 75 and 81.

Referring now to FIG. 3, the mash filtration unit 32 includes multiple filtration plates 33 that separate any fine particles from the mash. The larger spent grains are removed through gravity and discarded though the removal pipe 34 and discarded at step 36. After passing through the mash filtration unit 32, the liquid portion of the mash, referred to as wort, is directed to the next processing step, which is the boiling phase 35.

Once the wort has passed through the steam injection heater 38, mash coil 42 and mash filtration unit 32, the liquid wort is transferred to a boil kettle 44, as shown in FIG. 4. The wort from the mash filtration unit 32 enters into the open interior 56 of the boil kettle 44 through product line 46. In the embodiment shown, the open interior 56 of the boil kettle 44 has a sloped bottom wall 49 that feed the liquid wort to an outlet 45. The outlet 45 is connected to an inlet 51 of a hot wort holding tank 47. A flow control valve 83 controls the passage of the wort from the boil kettle 44 to the holding tank 47. The flow control valve 83 in the embodiment shown is a butterfly valve, although other types of valves, such as a gate valve, are contemplated.

When the flow control valve 83 is in a closed position, a steam injection heater 52, such as the Solaris steam injection heater from Hydro-Thermal Corporation, is used to heat the wort and recirculate the wort back into the open interior 56 of the boil kettle 44. The steam injection heater 52 receives a supply of steam 54 and injects the steam into the liquid wort. The steam injection heater 52 has the ability to nearly instantly boil the wort from an incoming temperature as low as 30° C. This eliminates lag time present in the normal production of beer wort. Additionally, the steam injection heater 52 allows for the ability to heat over boiling to achieve a terminal temperature up to 140° C. This allows for much higher hop utilization in the boil, which comes with a significant reduction in bittering hop usage.

The heated product from the steam injection heater 52 re-enters into the open interior 56 of the boil kettle 44 where it mixes with the remaining stored supply of wort. This mixing of hot and cold wort can create foam within the open interior 56. This process continues until all of the wort has been transferred in to the boil kettle, with the entire volume being at boiling temperatures. The heating process continues in this manner for the next phase of time, where the brewer introduces bittering hops and other additives, while simultaneously stripping unwanted volatiles from the wort. The boil kettle 44 further includes a spray head 58 that includes multiple nozzles 60 that can be used to reduce the amount of foam within the open interior 56. In accordance with the present disclosure, the spray head 58 receive a supply of cold brewing liquor from the line 92 to create a low-flow, high pressure spray of cold brewing liquor that is directed downward to control foam that may form at the top of the wort contained within the open interior 56. The spray head 58 directs the high-pressure, low-flow supply of liquid droplets to mechanically disrupt the foam. The disruption of foam is also aided by the thermal shock of cold liquid acting to shrink the bubble size. The spray nozzle is incorporated into the top of the boil kettle such that the volume of wort in the kettle does not reduce its effectiveness.

The source of brewing liquor for the boil-over protection device is from a system-wide high-pressure, sterile cold liquor system, rather than water as in past brewing systems. The amount of flow is metered and controlled by the controller 69 such that the composition of the wort within the boil kettle 44 is known and can be monitored.

In the embodiment shown in FIG. 4, a thermal battery 94 is used to pre-heat the wort before the wort enters into the boil kettle 44. The thermal battery 94 is charged and discharged similar to an electrical battery and extracts heat as the wort is cooled by the heat exchanger shown and described later. The thermal battery 94 can include a phase change material that stores heat and uses the stored heat to increase the temperature of the wort. Although a thermal battery 94 is shown, the thermal battery could be eliminated in some embodiments of the present disclosure.

Figure 5:
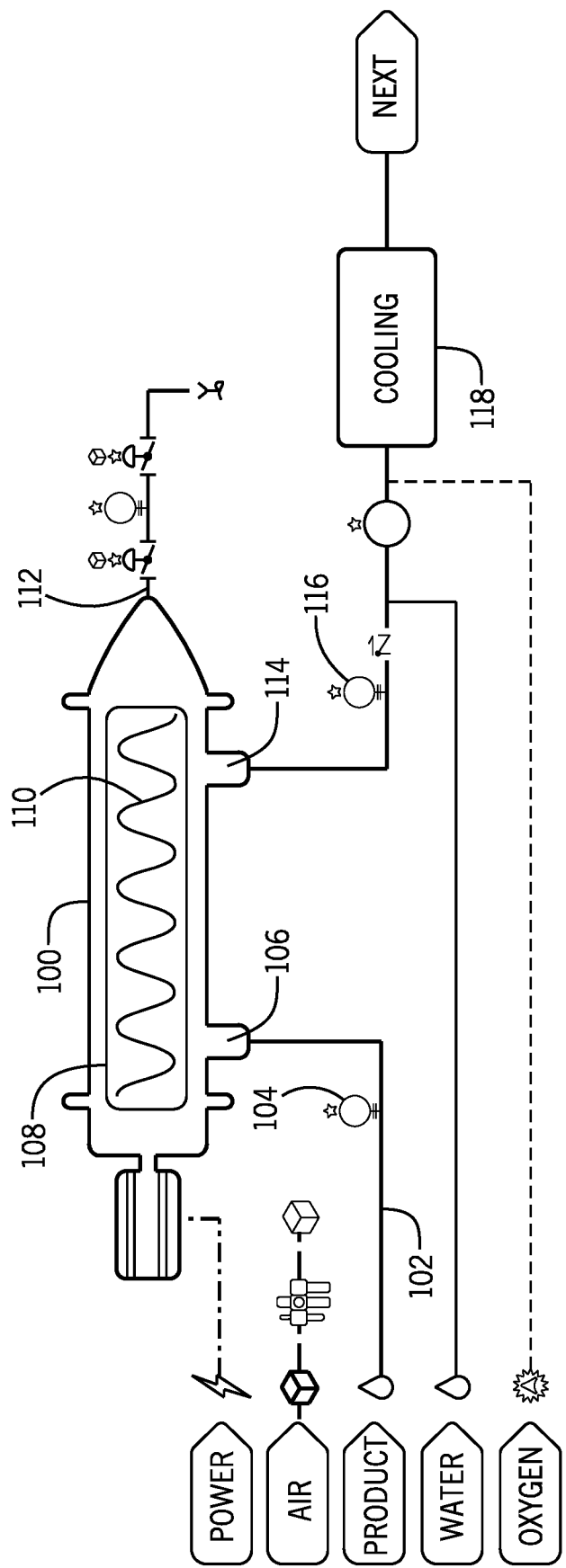
FIG. 5 is an illustration of a scraped surface sieve utilized in accordance with the present disclosure.

After heating, the hops solids as well as the protein precipitate, called trub, must now be separated. The output of the holding tank 47 is coupled to a pump 48 that directs the heated wort to a sieve 90. As shown, once the wort has been properly heated, the wort is drawn off by the pump 48 and directed to a scraped surface sieve 100 shown in FIG. 5. The scraped surface sieve 100 receives the wort along line 102 and the temperature is measured by temperature sensor 104. The wort enters into an inlet 106 and through the center of the sieve and flows through the filter element 108. The liquid wort flows through the sieve screen while the solids portion is retained in the sieve. Upon holding the maximum amount of solids from the wort in the sieve, the sieve briefly stops flow and discharges the solids load to the waste stream. The sieve 100 includes an internal auger 110 that scrapes solid particles from the filter element 108 and discharges the solid particles from the solids outlet 112. The filtered wort exits at the outlet 114, where another temperature sensor 116 measures the wort temperature. The scraped surface sieve removes the solids from the boil kettle and directs the product to a heat exchanger 118.

The heater 52 shown in FIG. 4 allows the system to heat the wort over the boiling point of water, which is an advantage over prior art systems. Additionally, due to the superior vaporization of VOCs from the grains inherent in the design of the steam injector 52, significant reductions in boiling times are expected.

Referring back to FIG. 2, the system includes a clean-in-place system 70. The CIP system is driven by software within the control unit 72 and, through the use of the multiple valves shown in FIG. 2, can be used to clean the system utilizing a flow of water at the desired intervals.

Although the system shown in FIG. 2 is described as being useful for heating wort in the beer brewing process, it should also be understood that the system could be used to cook cereal for other large brewing applications or in other situations. The steam injection heater 38 and coil 42 can be used to heat cereal to a desired temperature such that the cereal from the coil 42 could be directed to different locations and processed as desired.

Figure 6:
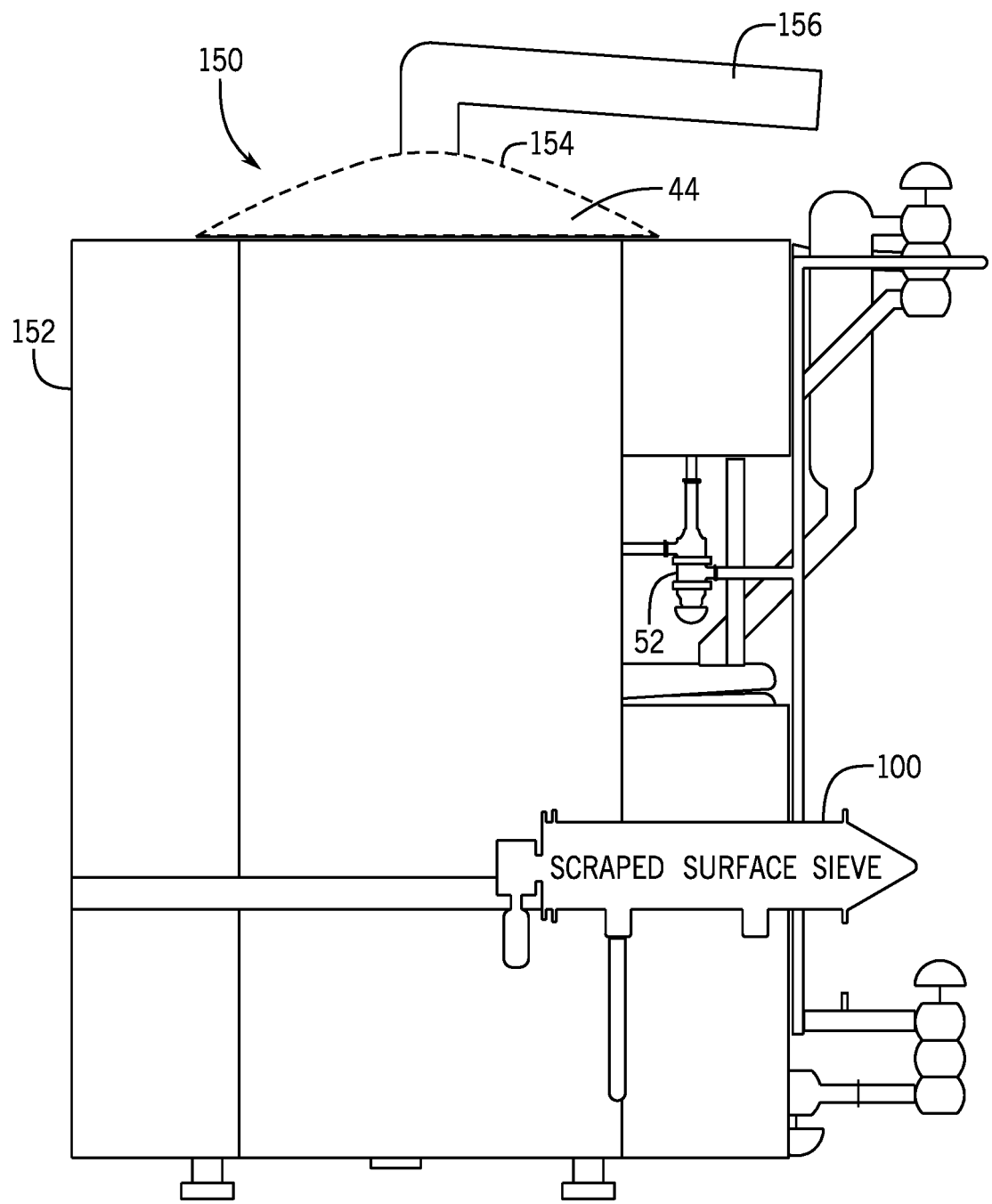
FIG. 6 is a schematic illustration of the wort generation system.
Figure 7:
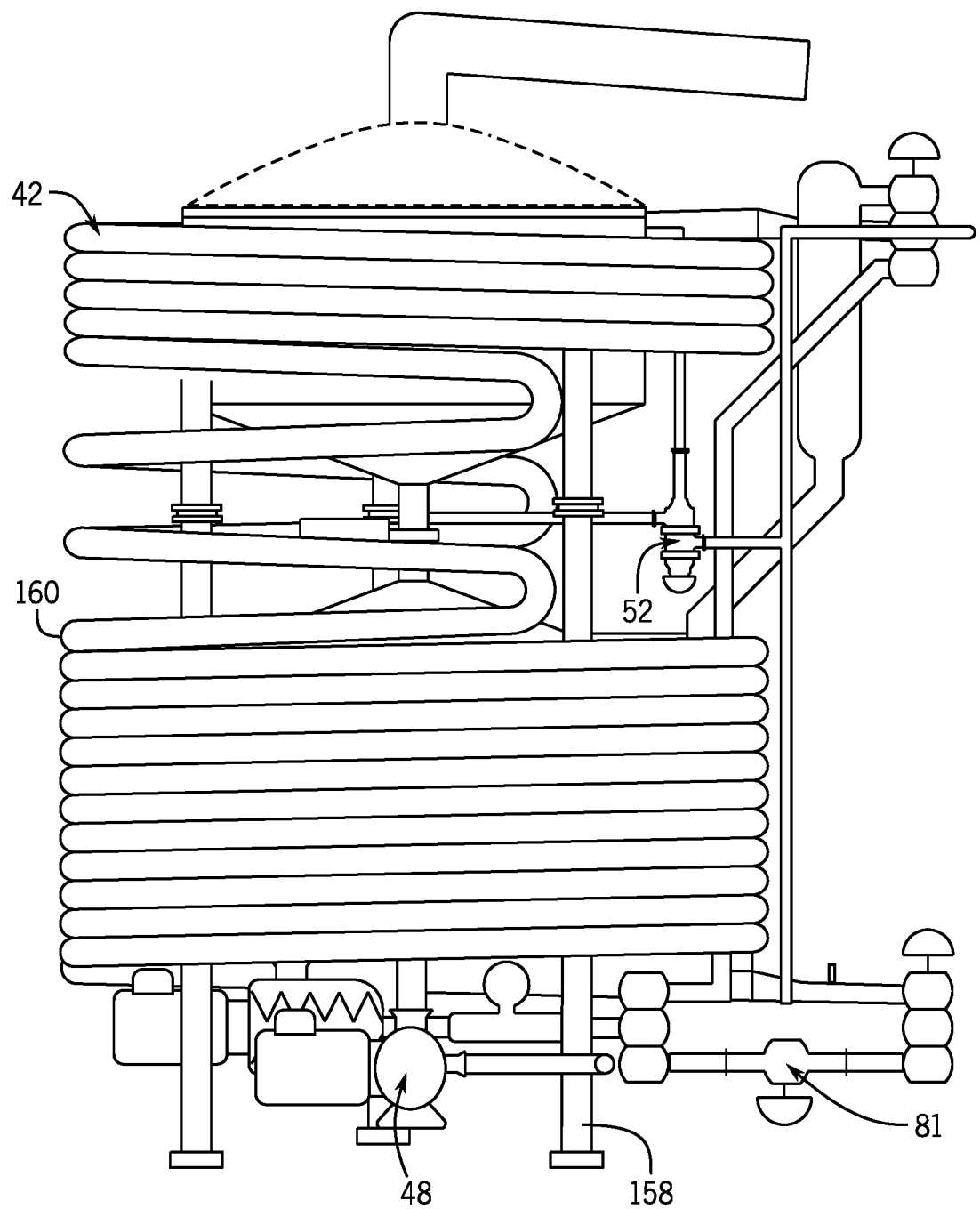
FIG. 7 is a view similar to FIG. 6 with the outer skin removed.
Figure 8:
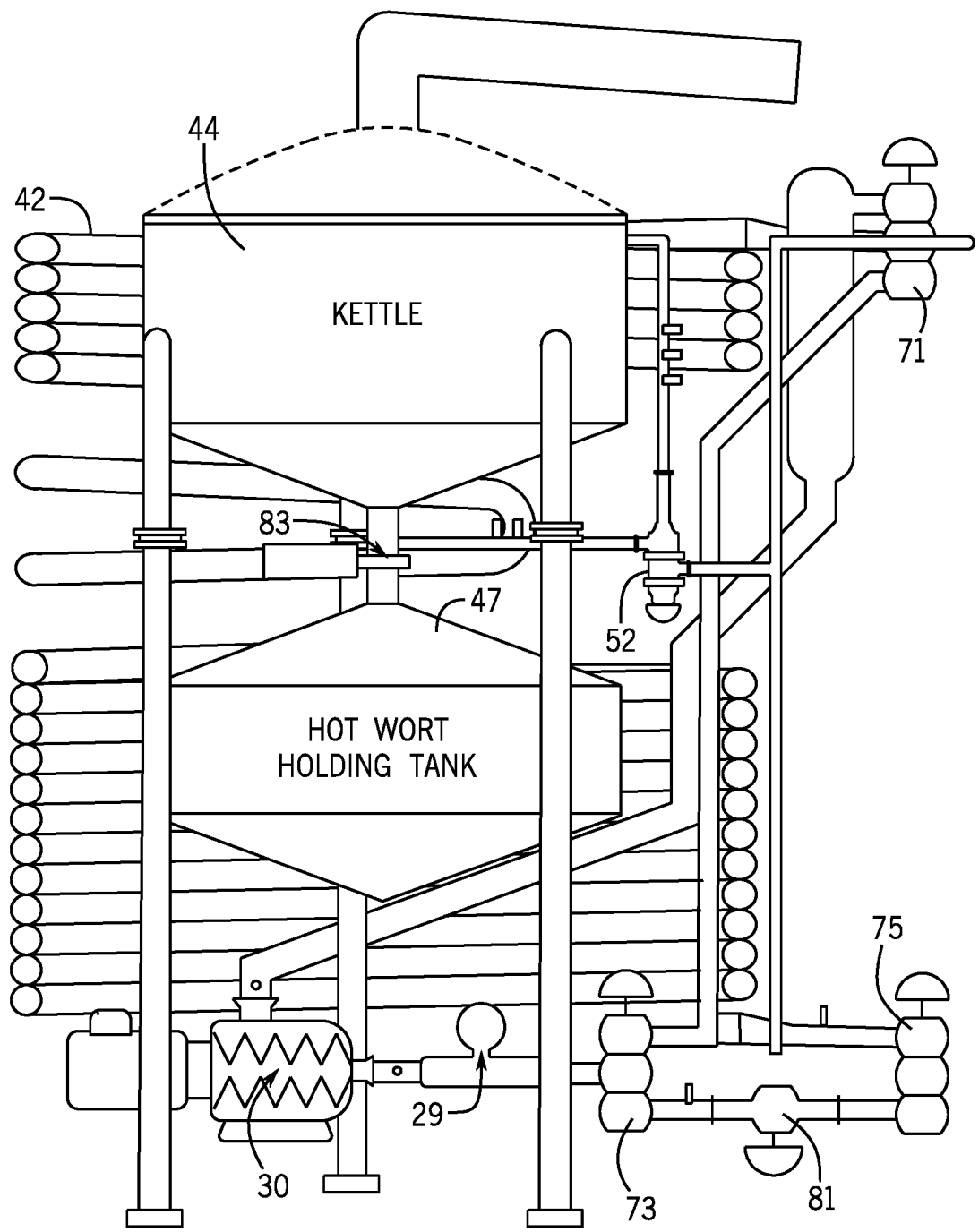
FIG. 8 is a view similar to FIG. 7 with the mash coil removed.

In the drawing illustrations of FIGS. 2-5, schematic illustrations of a system and method for wort generation for beer or distillation. Although these Figures schematically show the process and components required for the process, FIGS. 6-8 illustrate one possible physical configuration and implementation for incorporating the components. Although the physical implementation shown in FIGS. 6-8 provides physical locations for the various components relative to each other, it should be understood that various other configurations could be utilized while operating within the scope of the present disclosure. FIGS. 6-8 are meant to illustrate only one contemplated configuration.

In FIG. 6, the wort generation system 150 is shown. The physical system includes an outer skirt, cover or skin 152 that can be used to enclose many of the operating components of the wort system. As illustrated, the scraped surface sieve 100 is positioned outside of the outer skirt. In the view shown in FIG. 6, the steam injection heater 52 used as part of the boil kettle 44 can be seen. The boil kettle 44 includes a top cover 154 having a vent 156.

Referring now to FIG. 7, the wort system is supported by a series of support legs to support the various operating components, including the mash coil 42. As described previously, the mash coil 42 includes a series of individual coils 160 that lead between the first and second ends of the coil. As illustrated in FIG. 7, the pump 48 used to extract the heated wort from the hot wort holding tank 47 is positioned as illustrated. The pump 48 directs the heated wort to the scraped surface sieve 100 shown in FIG. 6.

As can be seen in the view of FIG. 8, the mash pump 30 is also mounted to the support legs and slightly below the mash coil 42. FIG. 8 further shows the position of the boil kettle 44 relative to the hot wort holding tank 47. Valve 83 is positioned between the boil kettle 44 and the hot wort holding tank 47 and can be selectively opened and closed to allow the heated wort to pass from the boil kettle 44 to the hot wort holding tank.

As can be understood by the views shown in FIGS. 6-8, the various components required by the wort generation system can be combined into a relatively small footprint thus eating the flexibility of its use in a brewing environment.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A system for generating wort from a slurry of milled grain and water for use in the brewing process, the system comprising:
   a pump operable to move the slurry through the system;
   a steam injection heater positioned downstream from the pump to heat the slurry and create a mash; and
   a stratified storage vessel having an inlet positioned to receive the mash from the steam injection heater and an outlet to return the mash to the pump, wherein the stratified storage vessel prevents mixture within the mash as the mash moves through the stratified storage vessel from the inlet to the outlet.

2. The system of claim 1 wherein the stratified storage vessel is a stacked coil of pipe extending from a first end to a second end.

3. The system of claim 2 wherein the pipe has a constant diameter from the first end to the second end.

4. The system of claim 2 wherein the stacked coil has a constant inner and outer diameter from the first end to the second end.

5. The system of claim 2 further comprising a filtration unit positioned to receive the mash from the stratified storage vessel, wherein the filtration unit removes coarse particles from the mash to create a wort.

6. The system of claim 5 further comprising a boil kettle having an open interior sized to receive the wort, wherein the boil kettle includes an outlet coupled to a second steam injection heater operable to heat the wort and return the wort to the open interior.

7. The system of claim 6 further comprising a spray head positioned within the boil kettle and operable to direct a spray of liquid onto the wort contained within the open interior of the boil kettle.

8. The system of claim 7 wherein the spray of liquid is brewing liquor.

9. The system of claim 8 wherein the volume of brewing liquor directed through the spray head is measured.

10. The system of claim 6 further comprising a filter positioned to receive the wort from the boil kettle and operable to remove any solids from the wort.

11. The system of claim 10 wherein the filter is a scaped surface sieve.

12. The system of claim 6 further comprising:
    a holding tank positioned to receive the heated wort from the boil kettle; and
    a flow control valve positioned between the outlet of the boil kettle and the holding tank.

13. The system of claim 12 further comprising a discharge pump operable to direct the wort from the holding tank.

14. The system of claim 1 wherein the pump operates to create a vacuum to draw in a dry solid and water to create the slurry.

15. The system of claim 1 wherein the system defines a closed loop and the system further comprises an expansion chamber operable to receive condensed steam from the steam injection heater during operation of system to generate wort.

\* \* \* \* \*